(12) United States Patent
Rahman et al.

(10) Patent No.: US 7,313,198 B2
(45) Date of Patent: Dec. 25, 2007

(54) SELF CALIBRATING TRANSMIT PATH CORRECTION SYSTEM

(75) Inventors: Mahibur Rahman, Lake Worth, FL (US); Sumit Anil Talwalkar, Plantation, FL (US); Andrew Gerald Zocher, Spring Grove, IL (US)

(73) Assignee: Motorola Inc., Schaumburg, IL (US)

( * ) Notice: Subject to any disclaimer, the term of this patent is extended or adjusted under 35 U.S.C. 154(b) by 1011 days.

(21) Appl. No.: 10/096,460

(22) Filed: Mar. 12, 2002

(65) Prior Publication Data

US 2003/0174783 A1 Sep. 18, 2003

(51) Int. Cl.
*H04L 27/00* (2006.01)
*H04L 27/04* (2006.01)

(52) U.S. Cl. .................. 375/297; 375/295; 375/301

(58) Field of Classification Search ............... 330/129, 330/149, 124 R, 295, 136, 2, 151; 380/34; 455/126, 69, 73, 108, 114.2, 115.1, 115.3, 455/119, 295, 67.11, 67.13, 116, 500, 501, 455/63.1, 91, 110, 127.3; 375/295, 296, 375/298, 300, 224, 283, 307
See application file for complete search history.

(56) References Cited

U.S. PATENT DOCUMENTS

| | | | | |
|---|---|---|---|---|
| 4,748,636 A | * | 5/1988 | Kato | 375/141 |
| 5,226,081 A | * | 7/1993 | Hinokimoto | 380/34 |
| 5,675,286 A | * | 10/1997 | Baker et al. | 330/129 |
| 5,878,089 A | * | 3/1999 | Dapper et al. | 375/325 |
| 6,009,317 A | * | 12/1999 | Wynn | 455/296 |
| 6,054,894 A | * | 4/2000 | Wright et al. | 330/149 |
| 6,298,096 B1 | * | 10/2001 | Burgin | 375/296 |
| 6,771,709 B2 | * | 8/2004 | Huang et al. | 375/296 |
| 7,013,257 B1 | * | 3/2006 | Nolan et al. | 703/28 |

* cited by examiner

*Primary Examiner*—David C. Payne
*Assistant Examiner*—Linda Wong
(74) *Attorney, Agent, or Firm*—Randi L. Karpinia; Brinkley, Morgan et al.; Sylvia Chen

(57) ABSTRACT

A transmit path correction system (34) for compensating for digital DC offsets, I/Q gain imbalances and I/Q phase imbalances includes a mixed signal forward path (36) and a mixed signal feedback path (38). The forward pat (36), which is operable to process input data symbols to produce at least one analog output signal, preferably includes a digital DC offset correction circuit (86) for compensating for digital DC offsets in the forward path (36) using at least one digital feedback signal (82, 84), an I/Q phase equalization circuit (90) for compensating for the I/Q phase imbalances in the forward path (36), and an I/Q gain equalization circuit (88) for compensating for the I/Q gain imbalances in the forward path (36) using the digital feedback signal(s) (82, 84). The feedback pat (38) processes the analog output of the forward path (36) to produce the digital feedback signal(s) (82, 84).

21 Claims, 6 Drawing Sheets

SELF CALIBRATING TRANSMIT PATH CORRECTION SYSTEM

BACKGROUND OF THE INVENTION

1. Field of the Invention

This invention relates in general to communication devices and in particular to communication devices incorporating a transmit signal path correction system with self-calibration capabilities.

2. Description of the Related Art

Non-idealities, such as direct current (DC) offsets and in-phase (I) and quadrature (Q) gain and phase imbalances, in the transmit signal path of a communication device can affect the quality of the modulated transmit signal. The specified non-idealities occur primarily due to circuit level mismatches in the analog quadrature circuitry at baseband as well as in the radio frequency (RF) and/or intermediate frequency (IF) signal paths. These transmit path non-idealities lead to degradation in the error vector magnitude (EVM), uplink bit error rate (BER), and the required transmit spectral mask performance. Also, in the case of 3G Wideband Code Division Multiple Access (WCDMA) transceivers, such non-idealities lead to degradation in Peak Code Domain Error (PCDE) performance.

To be able to meet performance requirements, the offsets and imbalances due to the baseband quadrature circuits must achieve difficult performance goals to allow for sufficient headroom for non-idealities in the I/Q modulator, RF/IF gain control, and power amplifier stages.

FIG. 1 illustrates a block diagram of a conventional I/Q modulated transmit signal path 10 within a communication device. An I-channel digital pulse-shaping filter 12 digitally filters an I-channel signal 14 and also provides for spectrum control. A Q-channel digital pulse-shaping filter 16 digitally filters a Q-channel signal 18 and also provides for spectrum control. Coupled to the I-channel digital pulse shaping filter 12 is an I-channel digital to analog (D/A) converter 20, receiving the output of the I-channel digital pulse-shaping filter 12, which converts the digital signal received from the I-channel digital pulse-shaping filter 12 into analog format while supporting sufficient dynamic range to meet the transmit performance requirements for a given communications protocol. Similarly, coupled to the Q-channel digital pulse shaping filter 16 is a Q-channel digital to analog (D/A) converter 22 receiving the output of the Q-channel digital pulse-shaping filter 16, which converts the digital signal received from the Q-channel digital pulse-shaping filter 16 into analog format while supporting sufficient dynamic range to meet the transmit performance requirements for a given communications protocol. Coupled to the I-channel digital to analog (D/A) converter 20 is an I-channel analog reconstruction filter 24 receiving the output of the I-channel digital to analog (D/A) converter 20, and providing means to eliminate the aliasing signal bands and to limit the far out quantization noise. Similarly, coupled to the Q-channel digital to analog (D/A) converter 22 is a Q-channel analog reconstruction filter 26 receiving the output of the Q-channel digital to analog (D/A) converter 22, and providing means to eliminate the aliasing signal bands and to limit the far out quantization noise. An I-channel analog attenuation and gain stage 28 is coupled to the output of the I-channel reconstruction filter 24 to support signal levels required at the input/output (I/O) of chip boundaries and also to support baseband power control schemes. Similarly, a Q-channel analog attenuation and gain stage 30 is coupled to the output of the Q-channel reconstruction filter 26 to support signal levels required at the input/output (I/O) of chip boundaries and also to support baseband power control schemes. Coupled to the outputs of the I-channel analog attenuation and gain stage 28 and the Q-channel analog attenuation and gain stage 30 is an I/Q modulator 32 to create the complex signal prior to gain control using voltage controlled amplifier (VCA) stages and a power amplifier (PA).

Sources of baseband DC offsets and I/Q imbalances include the I-channel D/A converter 20 and the Q-channel D/A converter 22, the I-channel reconstruction filter 24 and the Q-channel reconstruction filter 26, the I channel analog attenuation and gain stage 28 and the Q-channel analog attenuation and gain stage 30. Such offsets and imbalances can vary over process, temperature, and supply voltage; thus, they should be eliminated in a high performance but systematic manner to meet the stringent modulation accuracy requirements of today's communication systems.

Therefore, what is needed is a high performance, low cost and low power system for correction of non-idealities such as direct current (DC) offsets and I/Q quadrature gain and phase imbalances in the transmit signal path of a communication device.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

Figure 1:
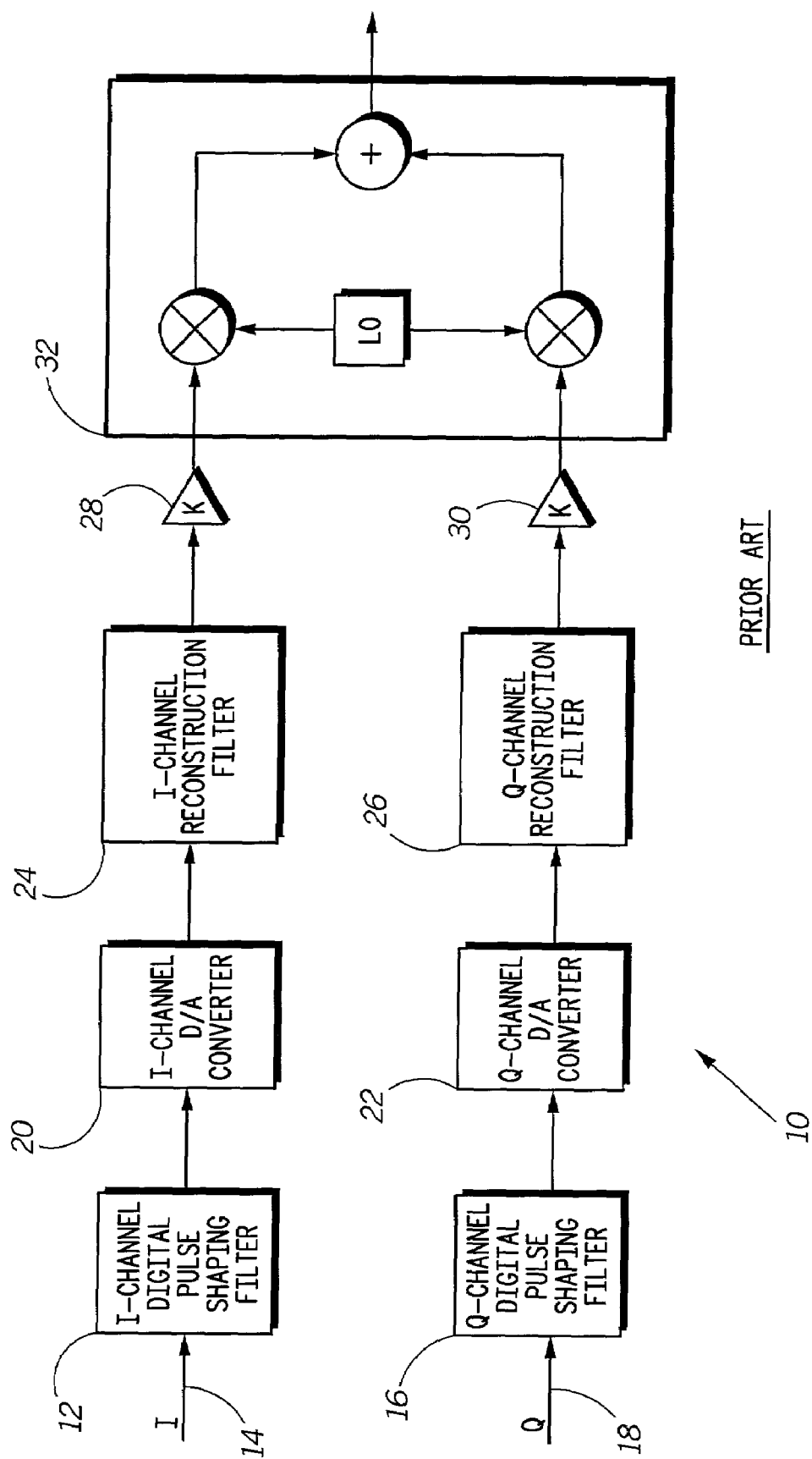
FIG. 1 illustrates a block diagram of a conventional I/Q modulated transmit signal path within a communication device.
Figure 2:
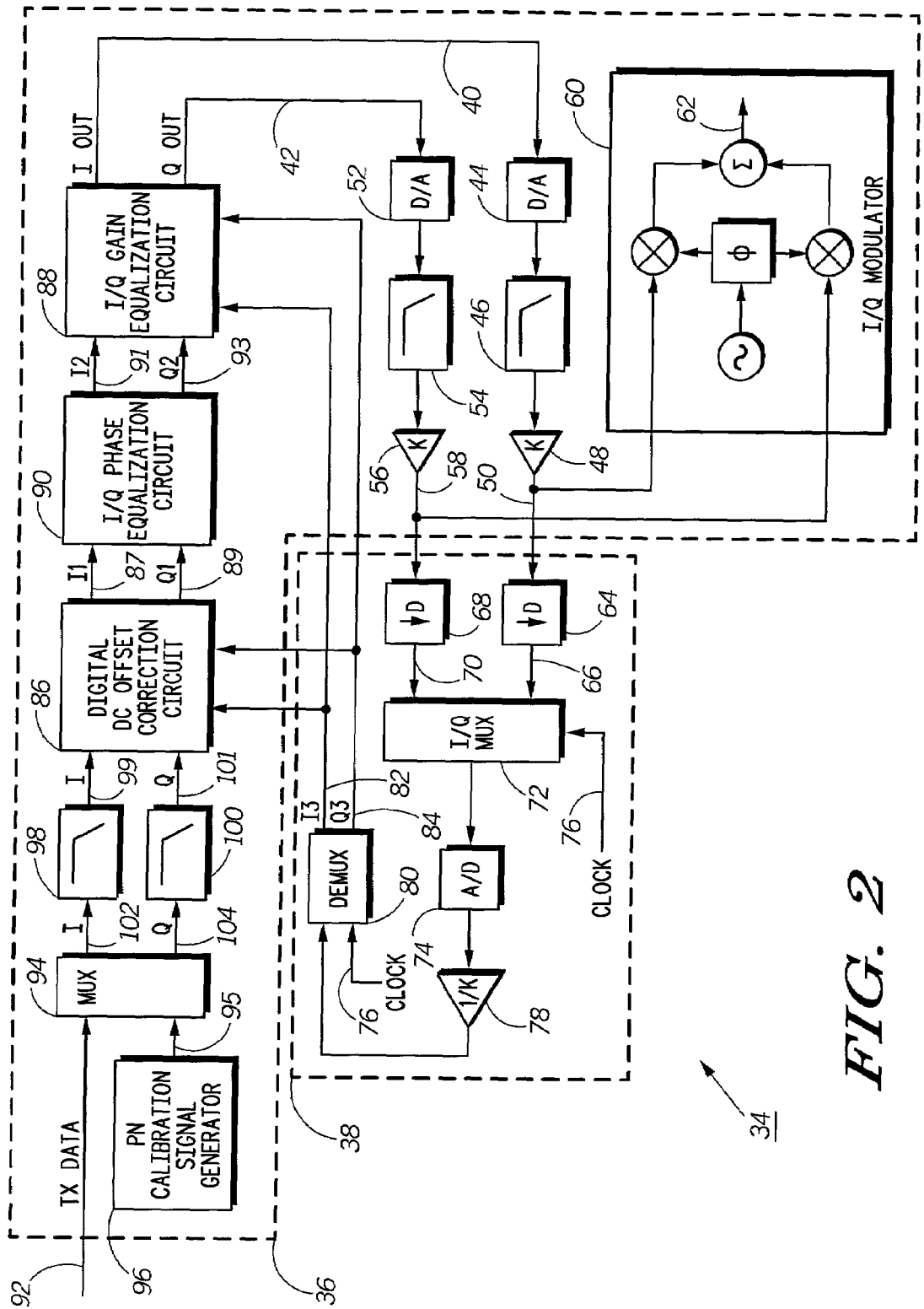
FIG. 2 illustrates a block diagram of a transmit path correction system, in accordance with the preferred embodiment of the present invention.

Referring to FIG. 2, a block diagram of a transmit path correction system 34 in accordance with the present invention is illustrated. The transmit path correction system 34 preferably compensates for DC offsets and I/Q gain imbalances in a closed loop manner while providing simultaneous support for open loop I/Q phase imbalance correction (to compensate for I/Q modulator phase imbalances) if desired. The transmit path correction system 34, in accordance with the present invention, includes a mixed signal feed forward path 36, and a mixed signal feedback path 38. It will be appreciated by one of ordinary skill in the art that the term "mixed signal path" in the description herein of the present invention refers to a signal path containing both analog and digital circuits.

In the mixed signal feed forward path 36, a transmit data signal 92 is fed into a multiplexor 94. The multiplexor 94 selects between a plurality of normal transmit data symbols of the transmit data signal 92 and a PN training signal 95 from a pseudonoise (PN) calibration signal generator 96. During a transmit warm-up sequence, when the transmit data signal 92 is not present, a low cost PN pseudo-random sequence generator, such as the PN calibration signal generator 96, can be used to send the PN training signal 95 to allow for acquisition of DC offsets and I/Q gain imbalances in the closed loop, fast adapt mode. Following this training period, normal transmit data can also be used for control loop adaptation in a slow adapt mode since the signal strength of the transmit data signal 92 can be low due to transmit power control requirements.

The I and Q output of the multiplexor 94 are fed into one or more digital pulse shaping filters. For example an I-multiplexor output 102 is fed into a first digital pulse shaping filter 98 and a Q-multiplexor output 104 is fed into a second digital pulse shaping filter 100. It will be appreciated by one of ordinary skill in the art that the transmit path correction system 34, as illustrated can correct for DC offsets in the baseband analog signal path, as well as correct for those DC offsets introduced by truncation and rounding effects internal to one or more digital pulse shaping filters (98, 100). An I-feed forward signal 99 output from the first digital pulse shaping filter 98 and a Q-feed forward signal 101 output from the second digital pulse shaping filter 100 are then fed into a digital DC offset correction circuit 86. An I1 signal 87 and a Q1 signal 89, resulting from processing done by the digital DC offset correction circuit 86, are fed into an I/Q phase equalization circuit 90. The resultant outputs of the I/Q phase equalization circuit 90, an I2 signal 91 and a Q2 signal 93, are then fed into an I/Q gain equalization circuit 88, resulting in an I-output signal 40 and a Q-output signal 42.

Next, inside the mixed signal feed forward path 36, each of the I-output signal 40 and the Q-output signal 42 from the digital data path is then processed through a corresponding D/A converter, filter, and gain stage. For example, the I-output signal 40 is processed through an I D/A converter 44, which converts the digital I-output signal 40 into anolog format while supporting sufficient dynamic range to meet the transmit performance requirements for a given communications protocol. Next, the analog signal is filtered by an I reconstruction filter 46, which provides for spectrum control. The filtered signal is then fed through an I baseband gain stage 48, which provides baseband attenuation and gain as required. The result of this signal processing is an I-analog signal 50. Similarly, the Q-output signal 42 is processed through a Q D/A converter 52, which converts the digital Q-output signal 42 into analog format while supporting sufficient dynamic range to meet the transmit performance requirements for a given communications protocol. Next, the analog signal is filtered by a Q reconstruction filter 54, which also provides for spectrum control. The filtered signal is then fed through a Q baseband gain stage 56, which provides baseband attenuation and gain as required. The result of this signal processing is a Q-analog signal 58.

Within the mixed signal feed forward path 36, the I-analog signal 50 and the Q-analog signal 58 are fed through an I/Q modulator 60, resulting in a complex output signal 62.

The I-analog signal 50 and the Q-analog signal 58 are also fed into the mixed signal feedback path 38, as shown in FIG. 2. In the feedback path 38, the I-analog signal 50 and the Q-analog signal 58 are down sampled by a ratio of D with respect to the sampling rate of the D/A converters. For example, the I-analog signal 50 is down sampled by a first down sampler 64 by a ratio of D with respect to the I D/A converter 44, thereby resulting in a down sampled I-analog signal 66. Similarly, the Q-analog signal 58 is down sampled by a second down sampler 68 by a ratio of D with respect to the Q D/A converter 52, thereby resulting in a down sampled Q-analog signal 70.

The down sampled I-analog signal 66 and the down sampled Q-analog signal 70 are I/Q interleaved using an I/Q multiplexor 72 into an A/D converter 74 to be able to exploit adaptive digital control technology. Utilization of a single multiplexed A/D rather than two separate I and Q A/D converters in the mixed signal feedback path 38 minimizes the potential of introducing additional sources of DC offsets and I/Q imbalances and also minimizes required power. The I/Q multiplexor 72 switches between sampling the down sampled I-analog signal 66 and the down sampled Q-analog signal 70 using a clock control signal 76. Given that the D/A converters 44, 52 must be sampled at rate higher than the signal bandwidth, it is interesting to note that the feedback sampling rate (for the I/Q multiplexor 72 at the A/D converter 74) can be much lower than the D/A sampling rate for the I D/A converter 44 and the Q D/A converter 52. Specifically, significant signal aliasing in the mixed signal feedback path 38 does not affect the DC offset and I/Q imbalance correction performance. This leads to reductions in the current drain in the analog and digital feedback circuitry of the mixed signal feedback path 38.

The output of the A/D converter 74 is processed through a digital gain compensation unit 78. The digital gain compensation unit 78 performs gain compensation for the forward path gain elements 48, 56. Following the A/D converter 74 and the digital gain compensation unit 78, a demultiplexor unit 80 deinterleaves the interleaved I/Q signal into an I-feedback signal 82 (I3) and a Q-feedback signal 84 (Q3). The I-feedback signal 82 and the Q-feedback signal 84 are then fed into the digital DC offset correction circuit 86 and the I/Q gain equalization circuit 88 of the mixed signal feed forward path 36 to allow for closed loop correction for the various offsets and imbalances. Preferably, as illustrated and in accordance with the present invention, the I-feedback signal 82 and the Q-feedback signal 84 are not fed into the I/Q phase equalization circuit 90 of the mixed signal feed forward path 36. Closed loop correction for I/Q phase imbalance is not necessary at baseband since the majority of such imbalances are due to the I/Q modulator 60 in the transmit path. The I/Q phase equalization circuit 90 in the mixed signal feed forward path 36 is primarily used to support the capability for open loop correction for those phase imbalances created primarily by the I/Q modulator unit 60.

In the following description, and in accordance with the present invention, a DC correction loop includes the digital DC offset correction circuit 86, the I D/A converter 44, the Q D/A converter 52, the I reconstruction filter 46, the Q reconstruction filter 54, the I baseband gain stage 48, the Q baseband gain stage 56, the I/Q multiplexor 72, the A/D converter 74, the gain compensation stage 78, and the demultiplexor 80 of FIG. 2. Further, in the following description, and in accordance with the present invention, a closed loop I/Q gain equalization loop includes the I/Q gain equalization circuit 88, the I D/A converter 44, the Q D/A converter 52, the I reconstruction filter 46, the Q reconstruction filter 54, the I baseband gain stage 48, the Q baseband gain stage 56, the I/Q multiplexor 72, the A/D converter 74, the gain compensation stage 78, and the demultiplexor 80. Further, in the following description, and in accordance with the present invention, an open loop I/Q phase equalization loop includes the I/Q phase equalization circuit 90, the I D/A converter 44, the Q D/A converter 52, the I reconstruction filter 46, the Q reconstruction filter 54, the I baseband gain stage 48, the Q baseband gain stage 56, and the I/Q modulator 60.

Figure 3:
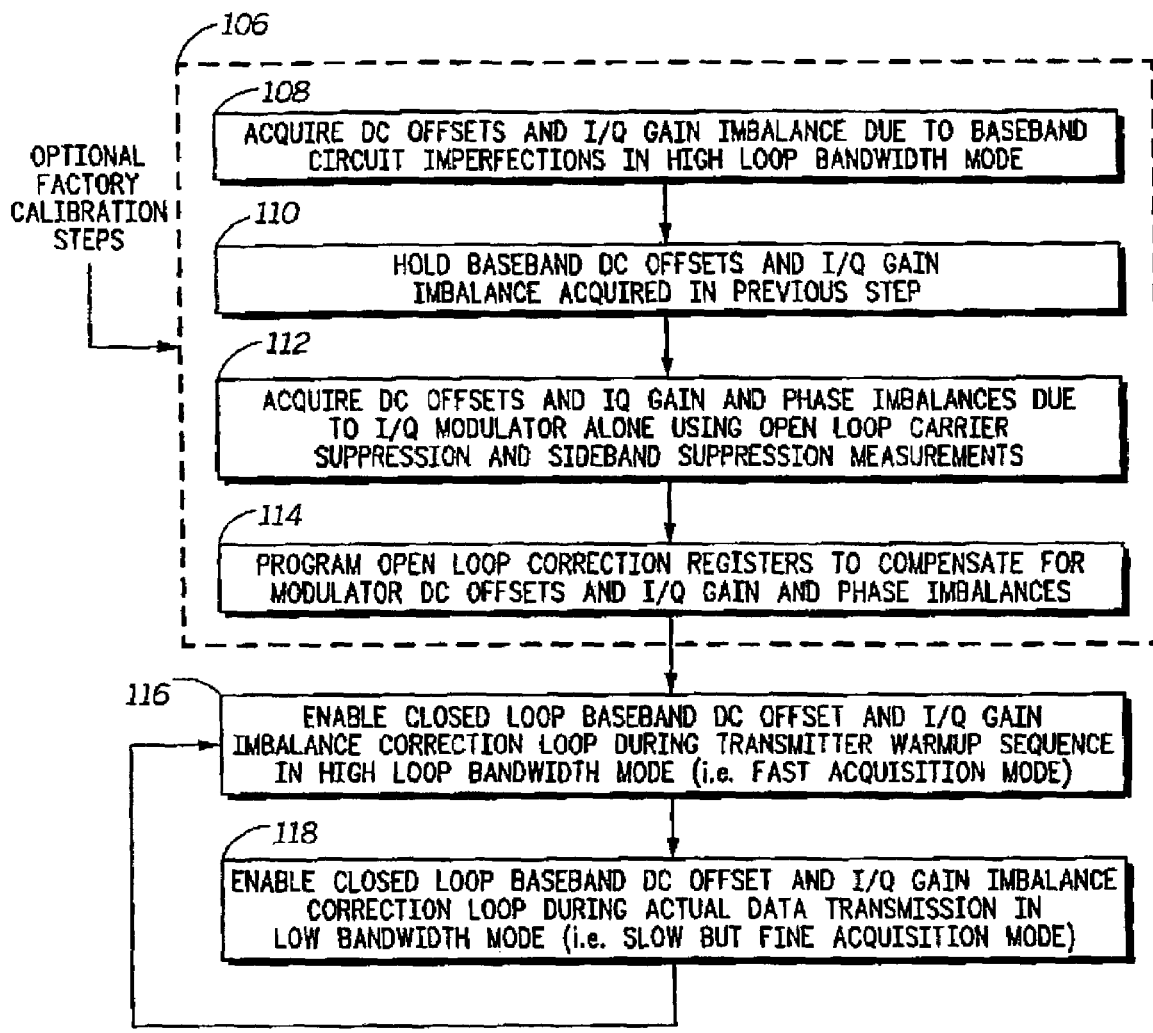
FIG. 3 is a flowchart illustrating the operation of the transmit path correction system of FIG. 2, in accordance with the preferred embodiment of the present invention.

FIG. 3 is a flowchart illustrating the operation of the transmit path correction system 34 of FIG. 2 in accordance with the preferred embodiment of the present invention. Specifically, the flowchart of FIG. 3 illustrates simultaneous open loop and closed loop correction in a transmit system design for a mobile transceiver device, in accordance with the preferred embodiment of the present invention. It will be appreciated by one of ordinary skill in the art that factory calibration steps 106, as illustrated, are optional, and not required. Thus, the open loop factory calibration capability, such as the factory calibration steps 106, needs to only be performed to meet modulator accuracy performance goals when modulator offsets and power amplifier non-linearities are much greater than that budgeted. In general, however, and in accordance with the present invention, a closed loop baseband DC offset and I/Q imbalance correction scheme is typically sufficient to meet the transmit modulation accuracy requirements while maintaining this desired performance over process, temperature, and supply voltage variations without the need for any factory calibration.

Beginning with Step 108, when the optional open loop correction capability is desired, baseband DC offsets and I/Q gain imbalances are acquired using the closed loop baseband correction loop, such as the mixed signal feedback path 38 of FIG. 2. Next, in Step 110, the baseband DC offsets and I/Q imbalances obtained in Step 108 are held in memory. Next, in Step 112, open loop carrier and sideband suppression measurements in the factory are used to acquire DC offset and I/Q gain and phase imbalance due to the I/Q modulator 60 alone. Next, in Step 114, these open loop correction values are programmed into programmable registers in the digital DC offset correction circuit 86, the I/Q gain imbalance correction circuit 88, and the I/Q phase equalization circuit 90 to compensate for the DC offset and I/Q gain and phase imbalance due to the I/Q modulator 60 acquired in Step 112.

Step 116 begins the desired process in accordance with the present invention wherein the closed loop baseband correction capability can be used to maintain modulation accuracy performance of the transceiver device due to temperature and supply voltage variations over the life of the transceiver device. In Step 116, during warm-up sequences, the DC offset correction and the I/Q imbalance correction loops operate in a high loop bandwidth mode and high feedback sampling rate to correct for these offsets in a rapid manner without degrading battery life performance. Next, in Step 118, the DC offset correction loop and the I/Q imbalance correction loops operate in low bandwidth modes at a very low feedback sampling rate to achieve the desired performance with a minimal impact to current drain. The process periodically cycles between Step 116 and Step 118 as required.

The control loop as illustrated has the capability to correct for DC offsets and I/Q imbalances due to process variations during a cold start warm-up process without the need for any factory calibration. It also has the capability to correct for such imperfections over temperature and supply voltage variations using those warm-up sequences following a sleep interval as well as during a long data application connection (such as that for WCDMA applications) while employing the slow adapt mode. A slow adapt mode is sufficient during a long data connection since such offsets and imbalances will vary slowly due to temperature and supply voltage variations.

Figure 4:
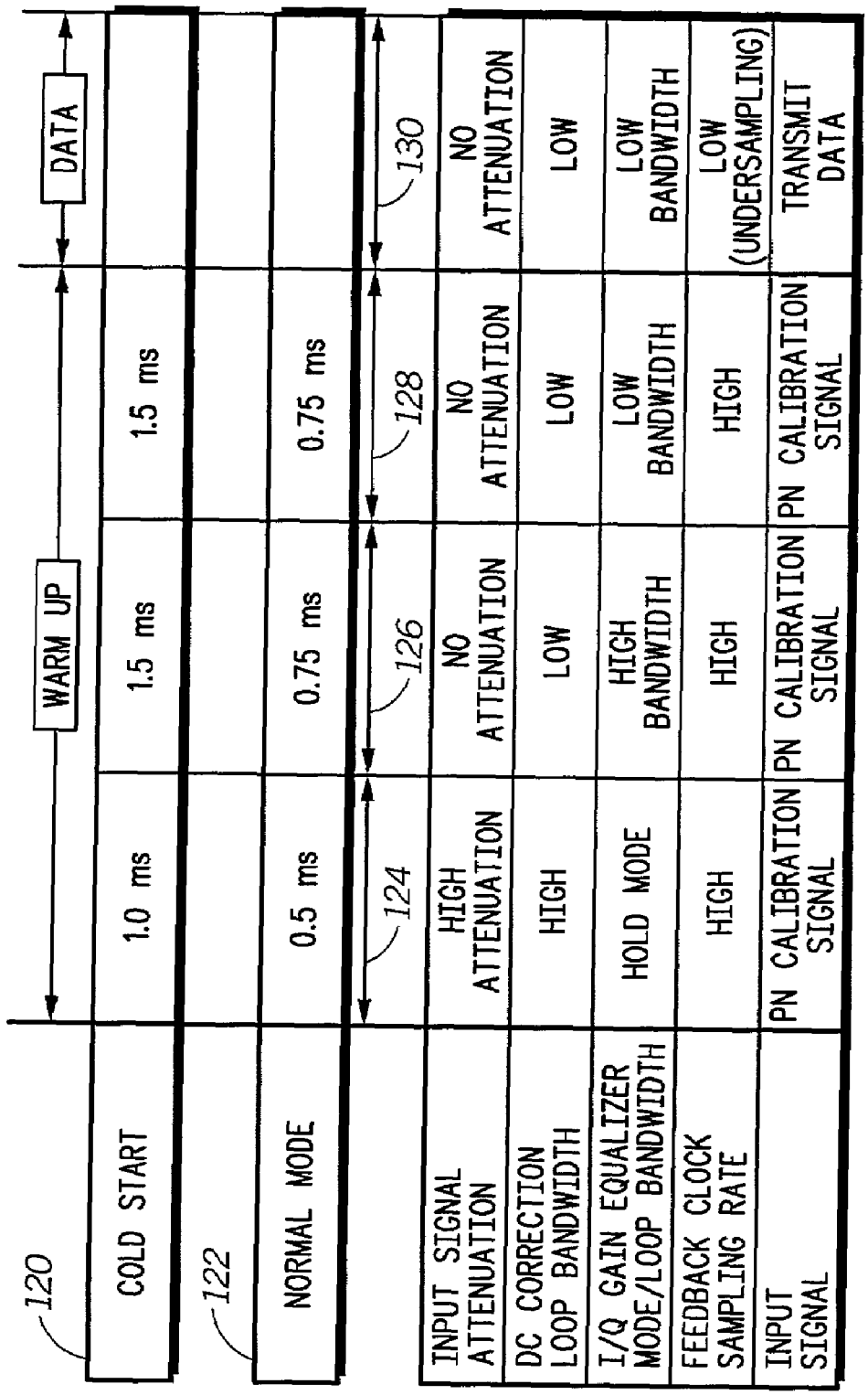
FIG. 4 illustrates one embodiment of a warm-up sequence for use in the operation of the transmit path correction system of FIG. 2, in accordance with the present invention.

FIG. 4 illustrates warm-up sequences in accordance with the preferred embodiment of the present invention, including a cold start warm-up sequence 120 (i.e., alter power on) and a normal mode warm-up sequence 122,(i.e., alter a sleep interval).

In a first warm-up stage 124, the closed loop DC offset and I/Q gain imbalance are calibrated during each warm-up sequence using the PN training signal 95 from the PN calibration signal generator 96 at a high feedback sampling rate to achieve fast control loop adaptation. This will minimize the length of the warm-up period with a negligible impact on battery life. During the first warm-up stage, the DC correction loop achieves fast loop adaptation by operating in a high loop bandwidth mode while the input signals from the digital pulse shaping filters 98, 100 are attenuated. The input signal should be sufficiently attenuated such that fast DC acquisition can be achieved while ensuring that signal strength is strong enough to fall in the dynamic range of the feedback A/D convener 74. The latter is because the A/D converter 74 dynamic range typically only need be significantly smaller than that of the I D/A converter 44 and the Q D/A converter 52 to achieve the desired residual offset/imbalance performance. While the fast DC adapt is in progress, the I/Q gain equalization circuit 88 is placed in a hold mode. Following the fast (or coarse DC adapt) period, the DC correction loop may be placed in a low bandwidth mode to acquire the residual offsets in a slow adaptation mode.

Next, in a second warm-up stage 126, I/Q gain equalization is performed in a high loop bandwidth mode with no input signal attenuation. No input signal attenuation is desired to achieve fast adaptation in this loop because it relies on the difference in magnitudes between the I-feedback signal 82 and the Q-feedback signal 84 to achieve adaptation. Thus, with no input signal attenuation, the signal to noise ratio of this magnitude difference is maximized, thereby achieving faster and more precise I/Q imbalance adaptation. Next, in a third warm-up stage 128, the I/Q gain equalization loop switches to a low bandwidth mode to correct for those residual imbalances not corrected in the high loop bandwidth mode.

Lastly, in a data stage 130, the DC correction and I/Q imbalance correction loops can continue to adapt in low loop bandwidth modes using the transmit data signal 92. Since the signal strength of the transmit data signal 92 can be unpredictable due to the dynamics of the power control system, it is sufficient to operate these control loops in a low bandwidth mode during actual data transmission to compensate for slowly varying DC offsets and I/Q imbalances.

Figure 5:
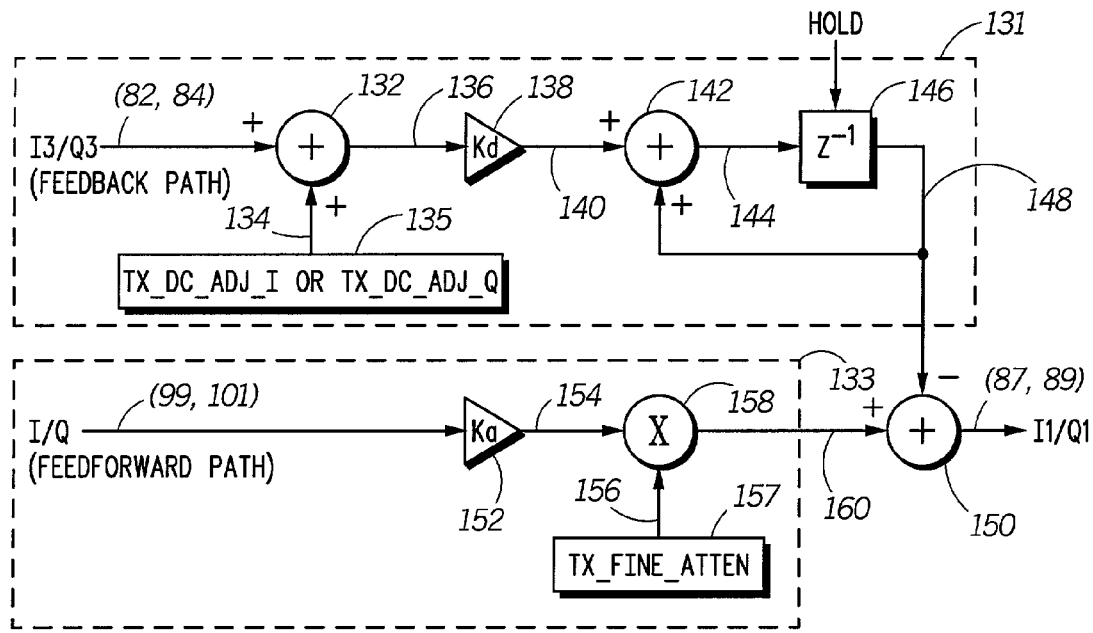
FIG. 5 illustrates a circuit topology of a digital dc offset correction circuit for use within the transmit path correction system of FIG. 2, in accordance with the preferred embodiment of the present invention.

FIGS. 5 though 7 illustrate the digital circuit topologies of the digital DC offset correction circuit 86, the I/Q phase equalization circuit 90, and the I/Q gain equalization circuit 88, respectively. The DC offset correction and I/Q gain equalization circuits 86, 88 operate in the mixed signal feed forward path 36 and the mixed signal feedback path 38 to compensate for DC offsets and I/Q gain imbalances in a closed loop manner. The illustrated circuits also have the capability to simultaneously compensate for those offsets and imbalances due to the I/Q modulator 60 in an open loop manner. It will be appreciated by those of ordinary skill in the art that simultaneous closed loop plus open loop correction capability is supported by the illustrated circuits in a high performance, low cost, and low power manner.

FIG. 5 illustrates a circuit topology of the digital DC offset correction circuit 86 for use within the transmit path correction system 34 of FIG. 2, in accordance with the preferred embodiment of the present invention. The digital DC offset correction circuit 86, as illustrated, includes a feed back path circuit 131 for processing the I-feedback signal 82 and/or the Q-feedback signal 84, a feed forward path circuit 133 for processing the I-feed forward signal 99 and/or the Q feed forward signal 101, and a subtractor 150 for combining the two signals, thereby resulting in the I1 signal 87 and the Q1 signal 89.

The feed back path circuit 131 uses a leaky integrator to average the DC contained in either the I-feedback signal 82 or the Q-feedback signal 84 (i.e., the demultiplexed outputs of the A/D converter 74 in the mixed signal feedback path 38). Simultaneous open loop correction capability is supported as shown by using the TX_DC_ADJ_I or the TX_DC_ADJ_Q programmable register input 134, as shown, if any optional factory calibration is desired to compensate for the I/Q modulator 60 offsets. The TX_DC_ADJ_I or the TX_DC_ADJ_Q programmable register input 134 is combined with the I-feedback signal 82 and/or the Q-feedback signal 84, respectively, using a first combiner 132. A first combiner output 136 is then fed into an open loop gain stage 138. The control loop bandwidth can be controlled by proper selection of an open loop gain (Kd) of the open loop gain stage 138. Next, an open loop gain stage output 140 is averaged using a second combiner 142. A second combiner output 144 is held in a hold stage 146 and then output as required as an averaged feedback signal 148 to be combined once again through the second combiner 142. The averaged feedback signal 148 is also subtracted out from the I-feed forward signal 99 or the Q-feed forward signal 101 as processed through the feed forward path circuit 133 to force the DC error at the output of the subtractor 150 to as close to zero as possible.

As an example of the operation of the digital DC offset correction circuit 86 as illustrated in FIG. 5, carrier suppression measurements performed in the factory can be used to program a TX_DC$_{13}$ ADJ_I or TX_DC_ADJ_Q register 135 to eliminate DC offsets due to the I/Q modulator 60. After that, during field operation of the product, the factory programmed open loop correction values can be held while the closed loop DC correction can be run during warm-up sequences, as well as during actual data transmissions. This will systematically eliminate DC offsets due to the baseband circuitry over temperature and supply voltage variations. The open loop correction value (the TX_DC_ADJ_I or TX_DC_ADJ_Q register 135), which is held, is subtracted out of the feedback path circuit 131 (prior to the leaky integrator). The effect of this is to create a DC bias to the actual DC offset (due to baseband DC offsets) such that when the DC correction control loop settles, this DC bias shows up in the feed forward path circuit 133. The indicated DC bias in the feed forward path circuit 133 is needed for open loop correction capability (of modulator offsets) while still allowing for simultaneous closed loop baseband DC correction to occur.

In the feed forward path circuit 133, the control input, TX_ATTEN, allows for a programmable coarse attenuation of the transmit signal (i.e. I-feed forward signal 99 and/or the Q feed forward signal 101). The I-feed forward signal 99 and/or the Q feed forward signal 101 is processed first through a feed forward path gain stage 152. A feed forward path gain stage output 154 is combined with a TX_FINE_ATTEN programmable input 156 using a multiplier 158 in the feed forward path circuit 133. This fine attenuation of the transmit signal allows for some head room in the feed forward path circuit 133 to ensure that there will be no clipping effects (after DC offset correction) in the transmit signal path. This fine attenuation feature can eliminate the need for additional bits of dynamic range in the I D/A converter 44 and the Q D/A converter 52. An attenuated feed forward signal 160 is then fed to the subtractor 150 as previously described.

Figure 6:
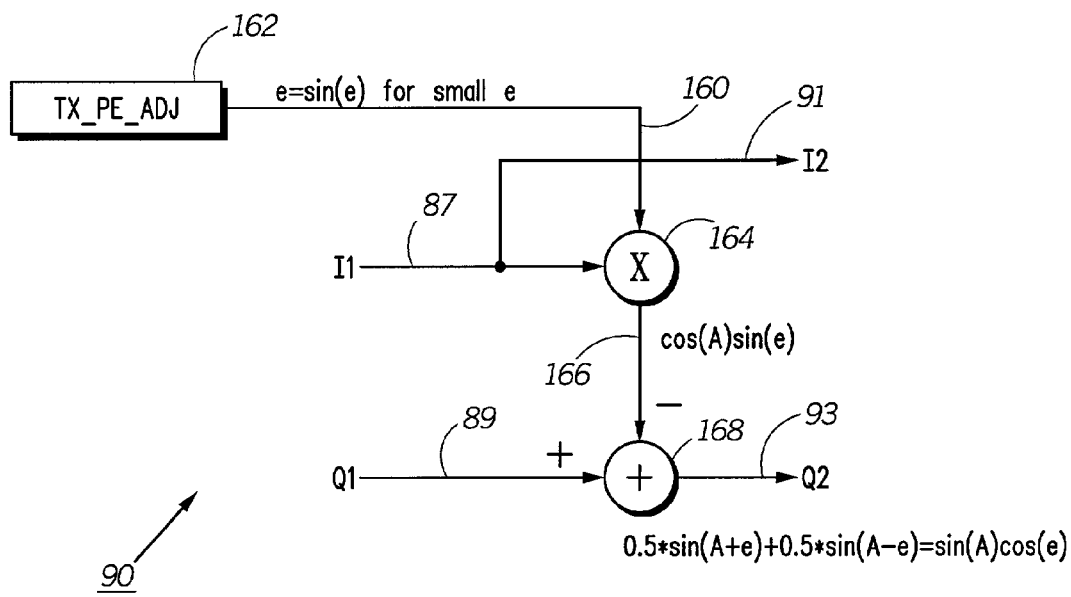
FIG. 6 illustrates a circuit topology of an I/Q phase equalization circuit for use within the transmit path correction system of FIG. 2, in accordance with the preferred embodiment of the present invention.

FIG. 6 illustrates a circuit topology of the I/Q phase equalization circuit 90 for use within the transmit path correction system 34 of FIG. 2, in accordance with the preferred embodiment of the present invention. The figure above shows how I/Q phase imbalance correction can be achieved optionally in the factory by programming an open loop phase correction value 160 in a TX_PE_ADJ input 162. Mathematically referring to the open loop phase correction value 160 (in radians) as "e" it can be approximated as:

$e = \mathrm{Sin}(e),$ for smaller "e".

The open loop phase correction value 160 is then multiplied using a multiplier circuit 164 by the I1 signal 87, mathematically yielding a multiplier circuit output 166:

$\mathrm{Cos}(A)\,\mathrm{Sin}(e),$ where "A" is the phase of the I1 signal 87.

Next, the multiplier circuit output 166 is subtracted from the Q1 signal 89 by a subtractor circuit 168, mathematically yielding the Q2 signal 93:

$$Q2 = \mathrm{Sin}(A+e) - \mathrm{Cos}(A)\mathrm{Sin}(e)$$
$$= \mathrm{Sin}(A+e) - (0.5 \times \mathrm{Sin}(A+e) - 0.5 \times \mathrm{Sin}(A-e))$$
$$= 0.5 \times \mathrm{Sin}(A+e) + 0.5 \times (\mathrm{Sin}(A-e)).$$

The effect of this result is to rotate the Q vector (=Sin (A+e)) in the phasor plane by a programmable amount of e (in radians) with respect to the I vector. It is interesting to note that if further trigonometric simplification of the above equation is performed, it reduces to:

$Q2 = \mathrm{Sin}(A)\mathrm{Cos}(e)$

As can be seen from the last equation, a gain imbalance of Cos(e) is introduced. This gain imbalance is negligible for small e, however, it is more noticeable for e>10 degrees (gain imbalance>0.15 dB). The specified gain imbalances are, however, easily eliminated by the functionality of the I/Q gain equalization circuit 88, which is described next in FIG. 7.

Figure 7:
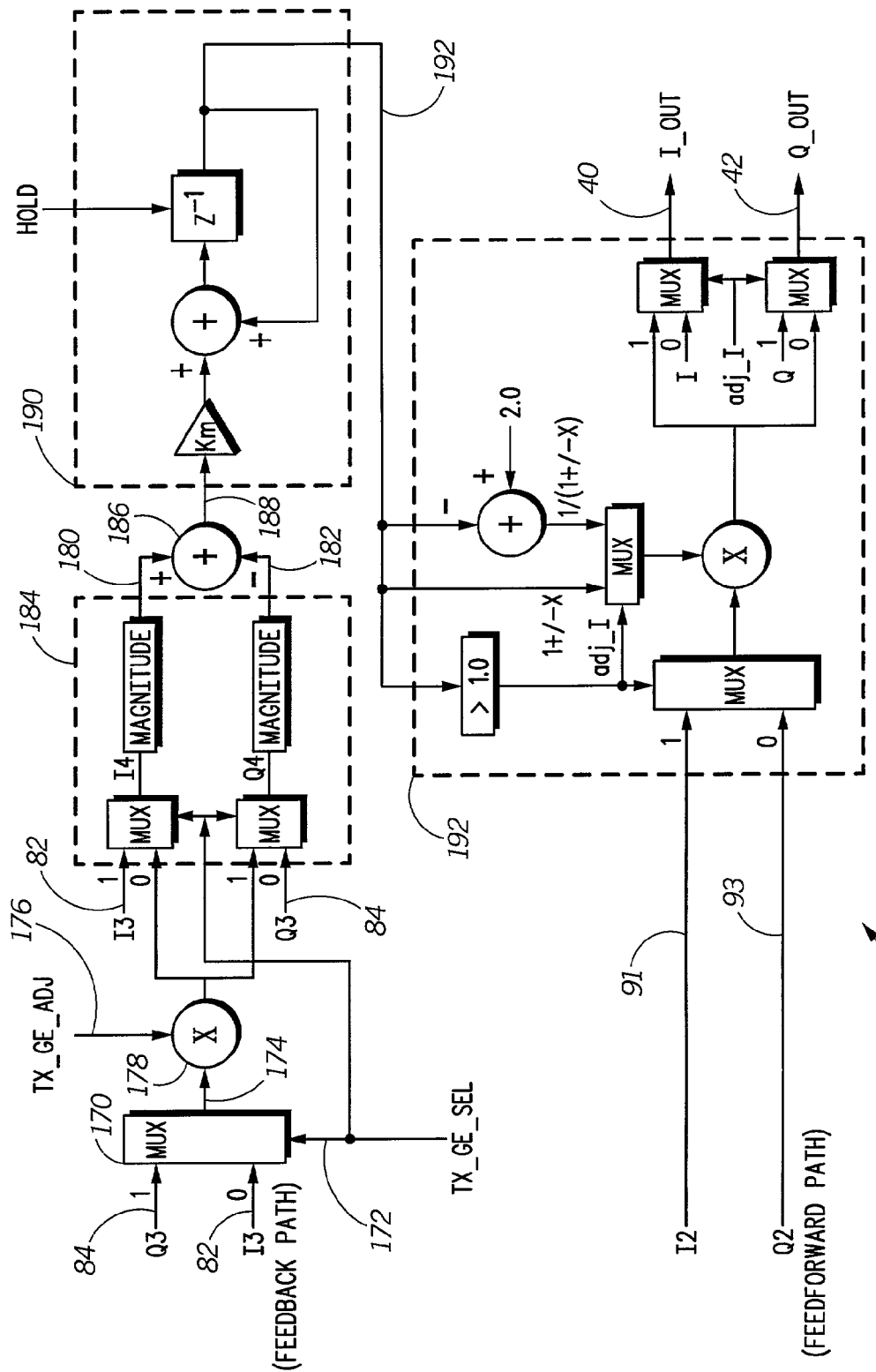
FIG. 7 illustrates a circuit topology of an I/Q gain equalization circuit for use within the transmit path correction system of FIG. 2, in accordance with the preferred embodiment of the present invention.

FIG. 7 illustrates a circuit topology of the I/Q gain equalization circuit 88 for use within the transmit path correction system 34 of FIG. 2, in accordance with the preferred embodiment of the present invention.

In the feedback signal path, the I-feedback signal 82 and the Q-feedback signal 84 are multiplexed together by a feedback path multiplexor 170 with a control input 172 (TX_GE_SEL) from a programmable register. The feedback path multiplexor output 174 is then mixed with an open loop gain imbalance correction value 176 (TX_GE_ADJ) from a programmable register using a feedback path mixer 178. These previous two operations allow for simultaneous open loop correction of I/Q gain imbalance due to the I/Q modulator 60.

The open loop gain imbalance correction value 176 (TX_GE_ADJ) is applied in the feedback signal pat (prior to the leaky integrator). The effect of this is to create an I/Q gain imbalance bias to the actual I/Q gain imbalance (due to baseband I/Q imbalances) such that when the baseband gain imbalance correction control loop settles, this gain imbalance bias shows up in the feed forward signal path. The indicated gain imbalance bias in the feed forward signal path is needed for open loop correction capability (of modulator imbalances) while still allowing for simultaneous closed loop baseband gain imbalance correction to occur. Note that the control input 172 (TX_GE_SEL) selects whether to apply the open loop gain correction to the I-feedback signal 82 or the Q-feedback signal 84.

An example of the open loop correction operation is described in the following. After first running baseband I/Q gain imbalance correction in a closed loop fashion, sideband suppression measurements can be performed in the factory to program the indicated programmable registers (TX_GE_SEL 172 and TX_GE_ADJ 176) to eliminate gain imbalances due to the I/Q modulator 60. Next, during field operation of the product the open loop factory programmed correction values can be held while the closed loop gain imbalance correction loop can be re-run during transmitter warm-up sequences as well as during long data transmissions. This will systematically eliminate gain imbalances due to the baseband circuitry imbalances over temperature and supply voltage variations. Next, an I-channel absolute value 180 (or magnitude) and a Q-channel absolute value 182 (or magnitude) are calculated using a calculation circuit 184. A difference 188 between the I-channel absolute value 180 (or magnitude) and the Q-channel absolute value 182 is then calculated using a subtractor 186. The difference 188 is then averaged using a leaky integrator 190.

An averaged magnitude error 192 is then used to continuously adjust the gain of either the I or Q feed forward channel (i.e. the I2 signal 91 and/or the Q2 signal 93) until the steady state gain error approaches a negligible value. Note that since only a single pole leaky integrator is employed for the leaky integrator 190, a small steady state residual imbalance error will result based upon the selection of the open loop gain (Km). Proper selection of the open loop gain during warm-up and data transmission modes ensures that the residual error will be less than that required.

As shown in FIG. 7, depending upon whether the gain correction value is greater or less than unity, gain correction is applied either to the Q-channel of the mixed signal feed forward path (when less than unity) or the I-channel of the mixed signal feed forward path (if greater than unity) on a sample-by-sample basis using a gain correction circuit 192. When the gain correction value detected is greater than unity during a given sample, clipping in the Q-channel is avoided by adjusting the gain of the I-channel using the reciprocal of the correction value. This ensures that clipping will not occur in both the I and Q channels by assuring that the resulting correction value applied to either path is always less than unity. Avoiding clipping in the digital signal paths preserves the desired transmit modulation accuracy to meet the desired EVM performance.

It is also worthwhile mentioning here that the reciprocal operation discussed earlier is implemented in a cost and current drain efficient manner by using the following first order binomial approximation:

$$1.0/(1.0+/-x)=1.0-/+x,$$

where "x" reflects a relative gain imbalance with respect to unity gain. Implementation of this equation is realized in the gain correction circuit 192.

Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A transmit path correction system comprising:
    a mixed signal forward path operable to process input data symbols to produce at least one baseband analog output signal, wherein the mixed signal forward path includes:
        a digital DC offset correction circuit operable to compensate for DC offsets in the mixed signal forward path using at least one digital feedback signal, and
        at least one digital to analog converter operably coupled to an output of the digital DC offset correction circuit and operable to at least assist in producing the at least one baseband analog output signal; and
    a mixed signal feedback path operable to receive and process the at least one baseband analog output signal to produce the at least one digital feedback signal, and further operable to provide the at least one digital feedback signal to the DC offset correction circuit,
    wherein the transmit path correction system is operable to source the at least one baseband analog output signal for modulation by a modulator.

2. A transmit path correction system as recited in claim 1, wherein the mixed signal forward path further comprises:
    an I/Q phase eqvalization circuit operable to compensate for I/Q phase imbalances in the mixed signal forward path.

3. A transmit path correction system as recited in claim 1, wherein the digital DC offset correction circuit performs fine attenuation in the mixed signal forward path prior to compensating for the DC offsets.

4. A transmit path correction system as recited in claim 1, wherein the mixed signal forward path further includes an I/Q gain equalization circuit operable to compensate for I/Q gain imbalances in the mixed signal forward path using the at least one digital feedback signal and wherein the mixed signal feedback path is further operable to provide the at least one digital feedback signal to the I/Q gain equalization circuit.

5. A transmit path correction system as recited in claim 4, wherein the mixed signal forward path further comprises:
    a multiplexor for receiving a transmit data signal and for receiving a PN training signal, wherein the multiplexor selects the input data symbols from between the transmit data signal and the PN training signal,
    wherein the multiplexor is programmed to:
        select the PN training signal during a transmit warm-up sequence, and
        select the transmit data signal after the transmit warm-up sequence; and
    a PN calibration signal generator, coupled to the multiplexor, for generating the PN training signal.

6. A transmit pat correction system as recited in claim 5 wherein the PN training signal selected by the multiplexor is used during the transmit warm-up sequence for acquiring at least one DC offset and at least one I/Q gain imbalance in a closed loop fast adapt mode.

7. A transmit path correction system as recited in claim 5, wherein the input data symbols selected by the multiplexor are used following the transmit warm-up sequence for control loop adaptation in a slow adapt mode.

8. A transmit path correction system comprising:
    a mixed signal forward path operable to process input data symbols to produce at least one baseband analog output signal, wherein the mixed signal forward path includes:
        a digital DC offset correction circuit operable to compensate for DC offsets in the mixed signal forward path using at least one digital feedback signal;

an I/Q phase equalization circuit operable to compensate for I/Q phase imbalances in the mixed signal forward path;

an I/Q gain equalization circuit operable to compensate for I/Q gain imbalances in the mixed signal forward path using the at least one digital feedback signal;

at least one digital to analog converter operably coupled to an output of the digital DC offset correction circuit and at least one output of the I/Q gain equalization circuit, the at least one digital to analog converter being operable to at least assist in producing the at least one baseband analog output signal and for converting at least one digital output signal produced by the I/Q gain equalization circuit into at least one intermediate analog output signal;

a multiplexor for receiving a transmit data signal and for receiving a PN training signal, wherein the multiplexor selects the input data symbols from between the transmit data signal and the PN training signal, and wherein the multiplexor is programmed to:

select the PN training signal during a transmit warm-up sequence, and select the transmit data signal after the transmit warm-up sequence;

a PN calibration signal generator, coupled to the multiplexor, for generating the PN training signal;

at least one digital pulse shaping filter coupled to the output of the multiplexor for filtering at least one output signal received from the multiplexor, thereby producing at least one forward signal output, wherein the at least one digital pulse shaping filter provides the at least one forward signal output to the digital DC offset correction circuit, wherein at least one input of the digital DC offset correction circuit is coupled to at least one output of the at least one digital pulse shaping filter and at least one output of the digital DC offset correction circuit is coupled to at least one input of the I/Q phase equalization circuit, and further wherein at least one input of the I/Q gain equalization circuit is coupled to at least one output of the I/Q phase equalization circuit;

at least one reconstruction filter coupled to the at least one digital to analog converter for filtering the at least one intermediate analog output signal;

at least one gain stage coupled to the at least one reconstruction filter for providing baseband attenuation and gain, thereby producing the at least one baseband analog output signal; and an I/Q modulator coupled to the at least one gain stage for converting the at least one baseband analog output signal into a complex output signal; and a mixed signal feedback path operable to receive and process the at least one baseband analog output signal to produce the at least one digital feedback signal, and further operable to provide the at least one digital feedback signal to the DC offset correction circuit and the I/Q gain equalization circuit.

9. A transmit path correction system as recited in claim 8, wherein the at least one output signal of the multiplexor comprises an I-multiplexor output and a Q-multiplexor output, wherein the at least one digital pulse shaping filter comprises a first digital pulse shaping filter for filtering the I-multiplexor output and a second digital pulse shaping filter for filtering the Q-multiplexor output, wherein the at least one digital output signal comprises an I-output signal and a Q-output signal, wherein the at least one digital to analog converter comprises an I-digital to analog converter and a Q-digital to analog converter, wherein the at least one reconstruction filter comprises and I-reconstruction filter and a Q-reconstruction filter, wherein the at least one gain stage comprises an I-baseband gain stage and a Q-baseband gain stage, wherein the I-digital to analog converter, the I-reconstruction filter, and the I-baseband gain stage process the I-output signal to produce an I-analog signal, wherein the Q-digital to analog converter, the Q-reconstruction filter, and the Q-baseband gain stage process the Q-output signal to produce a Q-analog signal, the I-analog signal and the Q-analog signal together constituting the at least one baseband analog output signal, and wherein the I/Q modulator combines the I-analog signal and the Q-analog signal to produce the complex output signal.

10. A transmit path correction system comprising:

a mixed signal forward path operable to process input data symbols to produce at least one analog output signal, wherein the mixed signal forward path includes:

a digital DC offset correction circuit operable to compensate for DC offsets in the mixed signal forward path using at least one digital feedback signal; and a mixed signal feedback path operable to receive and process the at least one analog output signal to produce the at least one digital feedback signal, and further operable to provide the at least one digital feedback signal to the DC offset correction circuit, wherein the mixed signal feedback path includes:

an I/Q multiplexor for interleaving the at least one analog output signal, thereby producing an interleaved analog signal;

an analog to digital converter coupled to the I/Q multiplexor for converting the interleaved analog signal into an interleaved digital signal;

a digital gain compensation unit coupled to the output of the analog to digital converter for gain compensation of the interleaved digital signal; and a demultiplexor unit coupled to the output of the digital gain compensation unit for deinterleaving the interleaved digital signal, thereby producing the at least one digital feedback signal.

11. A transmit path correction system as recited in claim 10, further comprising:

at least one down sampler coupled between an output of the mixed signal forward path and an input of the I/Q multiplexor for down sampling the at least one analog output signal and providing at least one down sampled analog signal to the I/Q multiplexor.

12. A transmit path correction system as recited in claim 11, wherein the at least one analog output signal comprises an I-analog signal and a Q-analog signal, wherein the at least one down sampler comprises a first down sampler for down sampling the I-analog signal and a second down sampler for down sampling the Q-analog signal, wherein the I/Q multiplexor interleaves the down sampled I-analog signal and the down sampled Q-analog signal, and wherein the at least one digital feedback signal comprises an I-feedback signal and a Q-feedback signal.

13. A method for transmit path correction comprising:

calibrating a closed loop DC offset and I/Q gain imbalance using a PN training signal from a PN calibration signal generator at a high feedback sampling rate to achieve fast control loop adaptation;

performing an I/Q gain equalization in a high loop bandwidth mode with no input signal attenuation; and subsequently performing the I/Q gain equalization in a low bandwidth mode to correct for one or more residual imbalances not corrected in the high loop bandwidth mode.

14. A method as recited in claim 13, wherein the step of calibrating a closed loop DC offset and I/Q gain imbalance comprises:

performing DC offset correction in a high loop bandwidth mode with input signal attenuation; and temporarily withholding I/Q gain equalization.

15. A method as recited in claim 13, further comprising:

continuing to adapt the DC offset correction and I/Q gain equalization in a low loop bandwidth mode using a transmit data signal.

16. A method for transmit path correction comprising:

processing a stream of input data symbols in a forward path to produce at least one baseband analog output signal, each data symbol having an in-phase (I) component and a quadrature (Q) component, the processing including performing digital to analog conversion of representations of the in-phase and quadrature components of the data symbols to produce the at least one baseband analog output signal;

processing the at least one baseband analog output signal in a feedback path to produce at least one digital feedback signal; and compensating for DC offsets introduced by the forward path using the at least one digital feedback signal, wherein the at least one baseband analog output signal is further supplied for modulation by a modulator.

17. The method of claim 16, further comprising:

compensating for I/Q gain imbalances introduced by the forward path using the at least one digital feedback signal.

18. The method of claim 16, further comprising:

compensating for I/Q phase imbalances introduced by the forward path without using the at least one digital feedback signal.

19. A transmit path correction system comprising:

a mixed signal forward path operable to process input data symbols to produce at least one analog output signal, wherein the mixed signal forward path includes:

a digital DC offset correction circuit operable to compensate for DC offsets in the mixed signal forward path using at least one digital feedback signal, and an I/Q gain equalization circuit operable to compensate for I/Q gain imbalances in the mixed signal forward path using the at least one digital feedback signal; and a mixed signal feedback pat operable to receive and process the at least one analog output signal to produce the at least one digital feedback signal, and further operable to provide the at least one digital feedback signal to the DC offset correction circuit and the I/Q gain equalization circuit, wherein the mixed signal forward path includes an I-channel end a Q-channel, and further wherein the t/Q gain equalization circuit is programmed to:

apply a first gain correction on a sample by sample basis to the Q-channel when a magnitude of the Q-channel is higher than a magnitude of the I-channel, and apply a second gain correction on a sample by sample basis to the I-channel when a magnitude of the I-channel is higher than a magnitude of the Q-channel.

20. A transmit path correction system comprising:

a mixed signal forward path operable to process input data symbols to produce at least one baseband analog output signal, wherein the mixed signal forward path includes:

an I/Q gain equalization circuit operable to compensate for I/Q gain imbalances in the mixed signal forward path using at least one digital feedback signal, and at least one digital to analog converter operably coupled to an output of the I/Q gain equalization circuit and operable to at least assist in producing the at least one baseband analog output signal; and a mixed signal feedback path operable to receive and process the at least one baseband analog output signal to produce the at least one digital feedback signal, and further operable to provide the at least one digital feedback signal to the I/Q gain equalization circuit, wherein the transmit path correction system is operable to source the at least one baseband analog output signal for modulation by a quadrature modulator.

21. A method for transmit path correction comprising:

processing a stream of input data symbols in a forward path to produce at least one baseband analog output signal, each data symbol having an in-phase (I) component and a quadrature (Q) component, the processing including performing digital to analog conversion of representations of the in-phase and quadrature components of the data symbols to produce the at least one baseband analog output signal;

processing the at least one baseband analog output signal in a feedback path to produce at least one digital feedback signal; and compensating for I/Q gain imbalances introduced by the forward path using the at least one digital feedback signal, wherein the at least one baseband analog output signal is further supplied for modulation by a quadrature modulator.

* * * * *